Dec. 21, 1954  J. FRASER  2,697,418
LIQUID METER
Filed Oct. 17, 1949  2 Sheets-Sheet 1

Inventor
John Fraser
by [signature]
Atty.

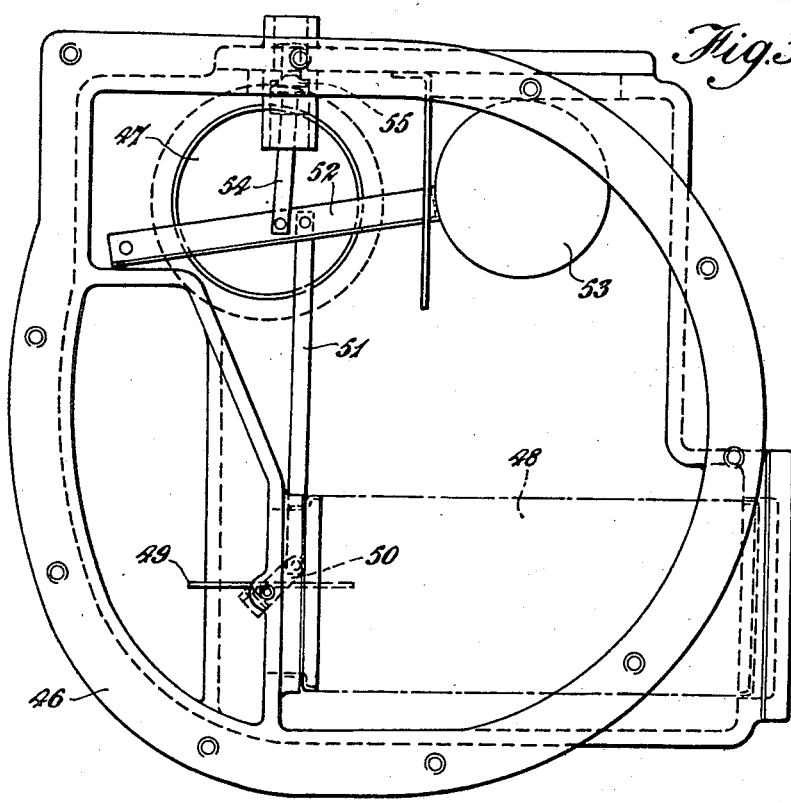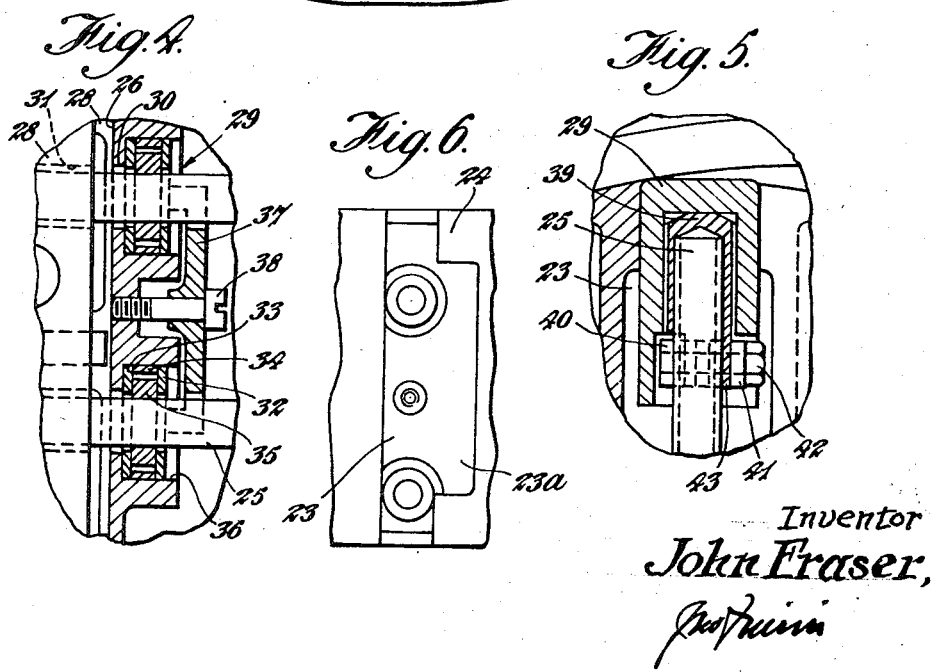

United States Patent Office 2,697,418
Patented Dec. 21, 1954

2,697,418

LIQUID METER

John Fraser, Tolworth, Surbiton, England, assignor to Avery-Hardoll Limited, Tolworth, Surbiton, England Application October 17, 1949, Serial No. 121,815

Claims priority, application Great Britain November 8, 1948

4 Claims. (Cl. 121—84)

This invention relates to liquid meters of the kind in which a vaned rotor is rotated in a metering chamber by liquid supplied thereto under pressure, the rotor making a substantially fluid-tight joint with the peripheral wall of the chamber over a part of the latter, and being spaced from the remainder of the said wall to provide an arcuate chamber through which the liquid passes from an inlet port to an outlet port, and the vanes being controlled by cam means so as to move inwardly and outwardly as the rotor rotates.

The objects of the invention are to provide a simple and accurate meter of the kind referred to, and to provide a meter which is capable of being operated without having a large pressure drop across it.

According to one feature of the invention, the vanes are arranged in pairs, the vanes of each pair being at opposite ends of a diameter of the rotor and being connected together to form a unit by rods passing through the rotor.

According to another feature of the invention the cam means which control the vanes are constituted by the inner peripheral surface of the metering chamber, diametrically opposite vanes being connected together so that inward movement of one due to its engagement with the said peripheral surface is accompanied by outward movement of the other.

The rotor is preferably self-aligning with respect to the metering chamber.

The invention is hereinafter described with reference to the accompanying drawings, in which:

Figure 3 is an elevation of a filter and air-separator unit shown in Figure 2, this unit being shown in Figure 3 separate from the meter itself;

Figure 4 is a detail of part of Figure 2 on a larger scale;

Figure 5 is a detail of part of Figure 1 on a larger scale; and

Figure 6 is a detail view showing one of the slots in the rotor, the view being taken in the direction of a radius of the rotor, and the vane being omitted.

Figure 1:
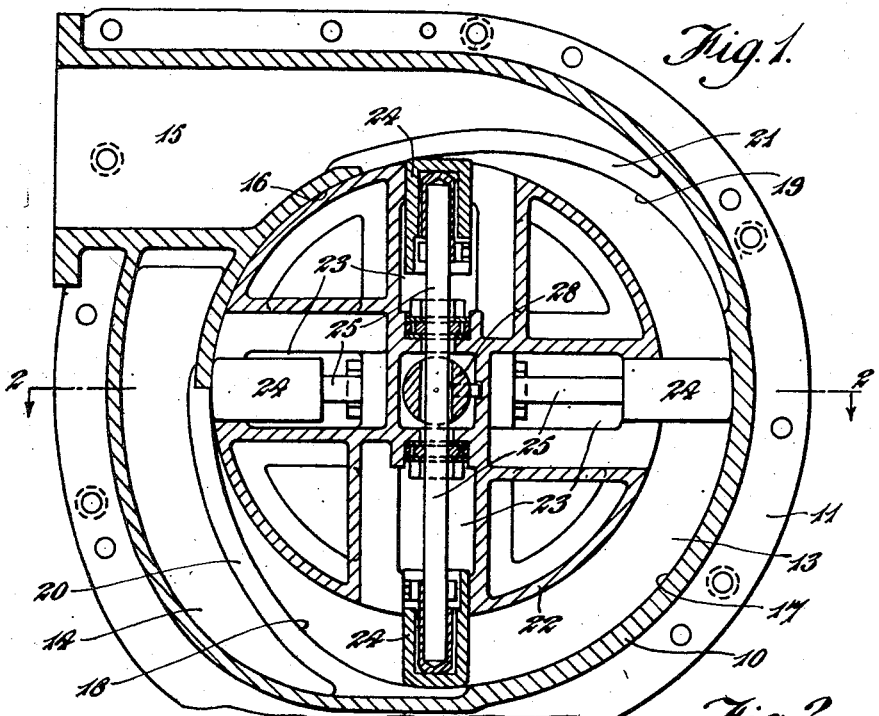
Figure 1 is a sectional elevation of one form of meter according to the invention, on the line 1—1 of Figure 2.

Referring to the drawings, the meter casing is formed by a peripheral wall member 10 clamped between two side plates 11 and 12, and defining, with the said side plates, a metering chamber 13, an inlet chamber 14 and an outlet chamber 15. The metering chamber 13 has two opposite concentric wall portions 16 and 17 each subtending an angle of about 90° at the centre of the chamber, the portion 17 being of larger radius than the portion 16, and two connecting arcuate portions 18 and 19, so arranged that the distance across the chamber through the centre, is substantially equal in all directions, some small variation being necessary between the wall portions 18 and 19 in view of the thickness of the vanes. Slots 20 and 21 in the portions 18 and 19 of the wall, extending in the peripheral direction, form inlet and outlet ports connecting the metering chamber 13 with the inlet and outlet chambers 14 and 15 respectively, the slots 20 and 21 being of less width than the chamber 13, so that a continuous peripheral surface is provided to engage the vanes.

Figure 2:
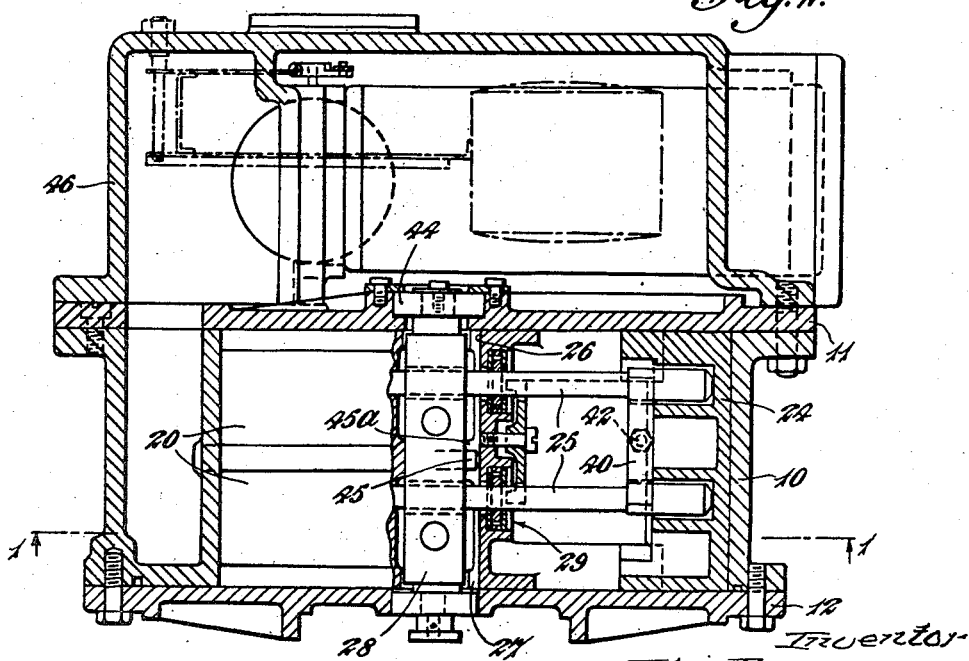
Figure 2 is a sectional plan of the meter shown in Figure 1, the section being taken on the line 2—2 of Figure 1, and a part of the rotor being omitted.

The rotor, which is mounted concentrically with respect to the wall portions 16 and 17, comprises a cylindrical drum 22 of a radius such that it has a running clearance with respect to the surface 16 of the metering chamber, the drum having four radial slots 23 each extending along its full length, the slots 23 being spaced 90° apart. A vane 24 is slidably mounted in each slot 23, the vanes 24 in opposite slots 23 being connected by rods 25 passing through the centre of the rotor, there being two rods 25 connecting each pair of vanes. As shown in Figure 2, the rods 25 connecting one pair of vanes are offset in the direction of the length of the rotor with respect to the rods 25 connecting the other pair of vanes. The slots 23 in the rotor are closed at their bottoms by walls 26 enclosing a central space 27 in the rotor through which the rotor shaft 28 passes, each rod passing through a packing gland indicated generally at 29, and through clearance holes 30 and 31 in the walls 26 and in the shaft 28.

Each packing gland 29 comprises (see Figure 4) a pair of washers 32 and 33 surrounding the rod 25 and spaced apart by a spacing tube 34, a packing ring 35, which is a close fit on the rod but has an external diameter smaller than the bore of the spacing tube, being located between the washers. The ring 35 has a thickness slightly less than the length of the spacing tube 34, so that it is a good fit between the washers, and each gland is located in a recess 36 in the bottom of a slot 23 by one end of a clamping member 37 having forked ends which engage the outer washers 32 of the two packing glands in one slot, and urge these washers against the spacing tubes 34, which in turn hold the inner washers 33 against the bottoms of the recesses. The clamping members 37 are secured by screws 38.

The vanes 24 are formed from carbon, and are cemented to thimbles 39 clamped onto the ends of the rods 25 by clamps each of which serves to clamp both thimbles of one vane to their respective rods, each clamp comprising two bars 40 and 41 (see Figure 5) drawn together by a bolt 42, one bar engaging the rods 25, and the other engaging projections 43 on the thimbles. Access to the bolts 42, for clamping or releasing the vanes, is obtained through widened portions 23ᵃ of the slots 23 (see Figure 6), which also serve to provide for free flow of liquid into and out of the slots as the vanes move out and in. The vanes are cemented in position with the rods assembled in a fixture to ensure correct relative positioning of the vanes.

The rotor shaft 28 runs in ball bearings 44 in the side plates 11 and 12, the rotor drum 22 being supported thereon only for a short length at its middle portion, as shown in Figure 2. The driving connection between the shaft 28 and the rotor is provided by a radial peg 45 carried by the shaft and engaging a groove 45ᵃ in the rotor drum 22.

The rotor is thus not restrained axially on the shaft, and it is free to rock slightly thereon, so that it may align itself with the casing.

The meter is intended for mounting with the rotor shaft 28 horizontal, so that the weight of the rotor is supported on the bearings 44, and the larger radius concentric portion 17 of the wall of the metering chamber is so located that a vane 24 coming into engagement with it after passing the inlet port 20 extends substantially vertically downwardly from the rotor, whilst a vane 24 leaving it to pass the outlet port 21 lies substantially horizontally. The weight of the vane thus tends to keep it in contact with this wall surface.

The vanes may be made of material other than carbon, and may be secured to the rods in any suitable manner, one vane being, for example, permanently secured to one end of each of the rods, and the other being secured to spigots, sockets or other member which fit into or around, or otherwise engage, the opposite ends of the rods.

An additional casing 46 is mounted on the side plate 11, which constitutes an air separator chamber and contains an automatic shut-off valve to prevent operation of the meter if the liquid supply fails and the pump continues to work, supplying air. Liquid flowing to the meter enters the casing 46 at 47, and passes through a filter 48 to the inlet chamber 14 of the meter. A pivoted disc valve 49 is mounted in the discharge outlet of the filter, and is coupled by an arm 50 and link 51 to an arm 52 carrying a float 53 which rests on the top of the liquid in the casing 46. The float arm 52 is also connected, by a link 54, to an air release valve 55 in the top of the casing 46.

Counting means (not shown) of the dial, cyclometer or any other type are mounted on the other side plate 12 of the meter, and are driven from the rotor shaft 28. Means of known type are provided for varying the speed ratio of the drive to the counting means, in order to enable the meter to be calibrated.

The meter operates in the following manner. Liquid supplied under pressure, for example by gravity or by a pump to the casing 46 fills that casing and lifts the float 53, thus opening the valve 49 and allowing the liquid to flow into the inlet chamber 14 of the meter, and through the inlet port 20 to the metering chamber 13, where it acts on the vanes 24 to rotate the rotor. The rotor turns in an anti-clockwise direction as seen in Figure 1, and as each vane 24 passes over the lower end of the inlet port 20 it closes the space between itself and the preceding vane, which space includes the slot 23 in which the said preceding vane works, that vane being, when the space is just closed, in its extreme outward position. Liquid is thus trapped in the space until the said preceding vane passes over the beginning of the outlet port 21, and liquid is delivered to the outlet chamber 15, the quantity of liquid delivered being equal to the volume of the arcuate space between the vanes when both are in engagement with the wall 17, and, in addition a volume equal to the displacement of the said preceding vane as it moves from its outer to its inner position. As the rotor rotates, each vane in turn is pushed inwardly by passing over the portion 19 of the peripheral wall of the metering chamber, the oppposite vane being urged outwardly due to the connection of the vanes, and so kept substantially in contact with the portion 18 of the wall after it leaves the concentric portion 16. Any gas or air which enters the casing 46 with the liquid collects in the top of that casing, and if sufficient collects to cause the float 53 to drop, the valve 55 is opened, and the air or gas escapes, either to atmosphere or to a pipe bypassing the meter, additional liquid flowing into the casing 46 to lift the float and reclose the valve. If the liquid supply fails, the float 53 drops and closes the valve 49, thus preventing the meter from continuing to work with only air or gas passing through it.

The meter according to the invention is comparatively simple to manufacture, and yet provides a very accurate measurement of liquid passing through it, as the leakage of liquid through it is very small, the provision of sealing glands on the rods connecting the vanes acting materially to reduce such leakage. The use of rods of relatively small section to connect the vanes, combined with the fact that it is only the length of these rods projecting on either side of the rotor which causes variation in the liquid displacement of the rotor as the latter rotates, ensures that such variations of displacement are small, and the resulting variations of the speed of the rotor are also small. As the vanes of each pair are connected together, the centrifugal force on one is largely compensated for by the centrifugal force on the other. The meter can therefore be run at a relatively high speed.

What I claim is:

1. A fluid meter comprising a substantially cylindrical casing having spaced inlet and outlet openings, a shaft eccentrically mounted in said casing, a rotor mounted on said shaft to be eccentric of said casing and defining therewith an arcuate chamber between said inlet and outlet openings, said rotor having a central space for said shaft and pairs of diametrically disposed axially extending slots radiating from a core surrounding said central space, said rotor core having holes in communication between said central space and slots, and vane units carried by said rotor including pairs of vanes respectively slidable in said pairs of slots with rods connecting said vanes and slidable in said core holes, said central core space being larger than said shaft so that the rotor loosely fits on said shaft to be self-aligning with respect to said casing, said rotor core having an internally extending portion supported on the shaft only for a short distance in the region of the center of the rotor, and the driving connection between the rotor shaft and the rotor comprising a radial peg.

2. A fluid meter comprising a substantially cylindrical casing having circumferentially spaced inlet and outlet openings, shaft means eccentrically mounted in said casing, a rotor mounted on said shaft means to be eccentric of said casing and defining therewith an arcuate chamber between said inlet and outlet openings, said casing having two oppositely disposed wall portions concentric with but on different radii from the axis of said shaft means and said rotor having a running peripheral engagement with one of said casing wall portions to provide a seal between said inlet and outlet openings opposite said arcuate chamber, said rotor having a core mounted on said shaft means and pairs of diametrically disposed axially extending slots radiating from said core, said rotor core having diametrical holes in communication between said pairs of slots, vane units carried by said rotor and each including a pair of vanes removably mounted on a plurality of spaced rods of small cross-section relative to said vanes, said rods being slidably mounted in said core holes with said vanes respectively slidable in the slots of one pair of slots and respectively having a sliding engagement between their outer edges and said casing as they revolve through said arcuate chamber, means releasably connecting said vanes with said rods to facilitate assembly and replacement thereof in said holes and slots, said connecting means rigidly connecting said vanes and rods in rigid coplanar vane units, and self-aligning packing glands surrounding said rods at the bases of said slots and sealing said core holes to resist leakage therethrough in either direction, each of said slots having a widened portion at one side only and between vane guiding surfaces adjacent the ends of the rotor to admit fluid behind the whole of said vanes and around said rods and reduce displacement of fluid upon reciprocation of said vane units to the volume of the displaced portions of said rods and thereby enable a substantially constant speed of rotation of the rotor.

3. A fluid meter as defined in claim 2 wherein each of said vanes has a plurality of parallel bores opening through the inner edges thereof, thimbles rigidly fixed in said bores respectively in accurate parallel axial relation and removably mounted on the respective ends of said rods with said vanes disposed in coplanar relationship, and means releasably securing said thimbles and vanes on said rods to provide a rigid separable coplanar vane unit.

4. A fluid meter as defined in claim 2 wherein each of said packing glands comprises a pair of washers for surrounding one of said rods, a tubular portion interposed between and spacing said washers, one of said washers being seated on said core substantially coaxially with one of said core holes, means carried by said rotor and releasably engaging the other of said washers to retain said washers and tube in position on said core, and a packing ring having a snug fit with the respective rod and disposed between said washers and within said tube, said ring having an outer diameter less than the inner diameter of said tube to permit lateral displacement of said ring within said tube by said rod, said ring having a thickness less than the spacing between said washers to preclude friction with said washers upon lateral shifting of said ring and to permit pressure of said ring against either of said washers to seal said gland in either direction.

References Cited in the file of this patent

UNITED STATES PATENTS

| Number | Name | Date |
| --- | --- | --- |
| 493,881 | Westinghouse et al. | Mar. 21, 1893 |
| 582,280 | Goodwin et al. | May 11, 1897 |
| 774,710 | Thompson | Nov. 8, 1904 |
| 1,361,669 | Bell et al. | Dec. 7, 1920 |
| 1,662,382 | Fieldhouse | Mar. 13, 1928 |
| 1,819,867 | Carlton | Aug. 18, 1931 |
| 1,891,302 | Caskey | Dec. 20, 1932 |
| 1,922,951 | Hawley | Aug. 15, 1933 |
| 1,969,024 | Miano | Aug. 7, 1934 |
| 2,043,963 | Morgan | June 9, 1936 |
| 2,073,215 | Mann | Mar. 9, 1937 |
| 2,263,145 | Smith | Nov. 18, 1941 |
| 2,272,170 | Granberg et al. | Feb. 10, 1942 |

FOREIGN PATENTS

| Number | Country | Date |
| --- | --- | --- |
| 343,842 | Great Britain | Feb. 26, 1931 |